United States Patent
Chen

(10) Patent No.: US 9,143,035 B2
(45) Date of Patent: Sep. 22, 2015

(54) SWITCHING POWER SUPPLY DEVICE WITH ON AND OFF WIDTH GENERATING CIRCUITS

(71) Applicant: FUJI ELECTRIC CO., LTD., Kawasaki-shi (JP)

(72) Inventor: Jian Chen, Matsumoto (JP)

(73) Assignee: FUJI ELECTRONIC CO., LTD. (JP)

( * ) Notice: Subject to any disclaimer, the term of this patent is extended or adjusted under 35 U.S.C. 154(b) by 180 days.

(21) Appl. No.: 13/860,980

(22) Filed: Apr. 11, 2013

(65) Prior Publication Data

US 2013/0307497 A1 Nov. 21, 2013

(30) Foreign Application Priority Data

May 17, 2012 (JP) .................................. 2012-113871

(51) Int. Cl.
- *G05F 1/40* (2006.01)
- *H02M 3/156* (2006.01)
- *H02M 1/42* (2007.01)

(52) U.S. Cl.
CPC .......... *H02M 3/1563* (2013.01); *H02M 1/4225* (2013.01); *Y02B 70/126* (2013.01)

(58) Field of Classification Search
USPC ............... 363/124, 79, 89, 74, 75, 16, 17, 27, 363/271, 37, 45; 323/222, 284, 282, 224, 323/288, 290
See application file for complete search history.

(56) References Cited

U.S. PATENT DOCUMENTS

| | | | |
|---|---|---|---|
| 6,984,963 B2 | 1/2006 | Pudutti et al. | |
| RE39,060 E * | 4/2006 | Okui et al. | 363/45 |
| 7,116,090 B1 | 10/2006 | Yang et al. | |
| 7,352,599 B2 * | 4/2008 | Shimada | 363/79 |

FOREIGN PATENT DOCUMENTS

JP 2006-320660 * 11/2006

* cited by examiner

*Primary Examiner* — Timothy J Dole
*Assistant Examiner* — Lorena Bruner
(74) *Attorney, Agent, or Firm* — Rossi, Kimms & McDowell LLP

(57) ABSTRACT

Aspects of the invention include a switching power supply device that includes a zero current detecting circuit that detects zero current of electric current flowing through the inductor to turn ON the switching element, an ON width generating circuit that determines the ON width of the switching element to turn OFF the switching element, and an OFF width detecting circuit that detects the OFF width of the switching element based on the output of the ON width generating circuit and the output of the zero current detecting circuit, and holds the OFF width until the next operating cycle. Aspects of the invention also include an ON width adjusting circuit that is included in the ON width generating circuit and adjusts the ON width of the switching element in the next operation cycle according to the width detected by the OFF width detecting circuit.

5 Claims, 10 Drawing Sheets

SWITCHING POWER SUPPLY DEVICE WITH
ON AND OFF WIDTH GENERATING
CIRCUITS

BACKGROUND OF THE INVENTION

1. Field of the Invention

Embodiments of the invention relate to switching power supply devices that receive a rectified AC voltage, and deliver a stable DC voltage, and in particular to switching power supply devices that perform power factor correction.

2. Description of the Related Art

A power factor correction (PFC) converter of a boost chopper type, a type of switching power supply device, generates a stable DC output voltage while generating an input current proportional to an input voltage utilizing self-excited oscillation of an inductor. The PFC converter has excellent characteristics including small-size, high efficiency, and production at a low cost. FIG. 9 shows a schematic construction of this type of switching power supply device, which is a power factor correction converter, in which the reference symbol BD designates a rectifier circuit that rectifies an AC power given from an AC power supply through an input filter F and delivers the rectified voltage to the switching power supply device.

This switching power supply device is provided with an inductor L connected to the rectifier circuit BD and a switching element Q that forms a current path from the rectifier circuit BD through the inductor L in the ON state of the switching element Q. The switching power supply device is further provided with a diode D that forms a current path between the inductor L and an output capacitor C2 in the OFF state of the switching element Q and a control circuit CONT that ON/OFF drives the switching element Q to control the current flowing through the inductor L. The symbol C1 designates an input capacitor.

The switching element Q provides the inductor L with a current proportional to the input voltage applied to the switching power supply device in the ON state of the switching element Q. The current flowing through the inductor L, inductor current, rises from zero over the ON period of the switching element Q. Upon turning OFF of the switching element Q, the voltage across the inductor L changes its polarity and the inductor current is delivered to the output capacitor C2 in the output side through the diode D. When the inductor current becomes zero, the switching element Q is turned ON again to transfer to the next cycle. This procedure is repeated.

The control circuit CONT basically conducts two functions: one of them is determination of an ON width Ton of the switching element Q corresponding to the difference between the output voltage Vo obtained across the output capacitor C2 and a predetermined target output voltage and turning OFF of the switching element Q in a voltage mode; the other is zero current switching, which performs detecting zero current through the inductor and turning ON of the switching element Q.

The input voltage Vi given to the inductor L has a voltage waveform varying over a half period of a sine wave. In the ON/OFF control of the switching element Q in the voltage mode, however, an ON width Ton of the switching element Q is basically constant irrespective of the phase of the input voltage Vi. As a result, at a low voltage phase where the instantaneous value of the input voltage Vi is low, the current supplied to the inductor L is insufficient, which increases so-called dead angle, a reactive voltage phase, lowering a power factor.

To improve the power factor, it has been proposed in U.S. Pat. No. 6,984,963 (also referred to herein as "Patent Document 1") and U.S. Pat. No. 7,116,090 (also referred to herein as "Patent Document 2") to broaden the ON width Ton of the switching element Q in the phase of low instantaneous value of the input voltage Vi than in a high voltage phase where the instantaneous value of the input voltage Vi is high. In the method disclosed in Patent Document 1, the ON width Ton of the switching element Q is adjusted based on the phase information of the input voltage Vi obtained by detecting the peak value of the inductor current, which is proportional to the input voltage Vi. In the method disclosed in Patent Document 2, the ON width Ton of the switching element Q is adjusted based on the phase information of the input voltage Vi obtained by detecting the differential value of the inductor current, which is also proportional to the input voltage Vi.

In the both methods disclosed in Patent Documents 1 and 2, the phase information of the input voltage Vi is obtained by inserting a detecting resistor for inductor current detection in the current path including the inductor L and detecting the inductor current from the voltage drop across the detecting resistor. The resistance value of the detecting resistor is determined from the specifications, or circuit constants, of the switching power supply device including the inductance value of the inductor L and the output voltage Vo. The resistance value changes the amount of compensation, or adjustment width, of the ON width Ton. However, in a phase of low instantaneous value of input voltage Vi, where the current flowing in the inductor L is small, the accuracy of current detection using the detecting resistor decreases and the phase information of the input voltage Vi is hardly detected with high accuracy. Moreover, noises adversely affect the current detection since the inductor current itself is low in proportion to the input voltage Vi.

Thus, as has been described, there exists certain shortcomings in the related art.

SUMMARY OF THE INVENTION

Embodiments of the invention are directed to these and other shortcomings. Some embodiments provide a switching power supply device having a simple construction that readily detects phase information of the input voltage with high accuracy and broaden the ON width of the switching element at the phase of a low instantaneous value of the input voltage Vi to avoid decrease of a power factor notwithstanding decrease in the inductor current.

Some embodiments detect when the OFF width Toff of the switching element and the phase of the input voltage Vi are closely related as shown in FIG. 10, for example. In some embodiments, it is detected, in particular that the OFF width Toff of the switching element is approximately proportional to the input voltage Vi at a phase of low instantaneous value of the input voltage Vi. In some embodiments, following relation holds in a switching power supply device of a boost chopper type among the ON width Ton of the switching element, the OFF width Toff of the switching element, the input voltage Vi, and the output voltage Vo:

$$Vi*Ton=(Vo-Vi)*Toff \rightarrow Toff=Vi*Ton/(Vo-Vi).$$

A switching power supply device in accordance with some embodiments includes: an inductor L connected to a rectifier circuit for rectifying AC power, a switching element Q forming a current path from the rectifier circuit through the inductor in an ON state of the switching element Q; a diode D forming a current path from the inductor L to an output capacitor C2 in an OFF state of the switching element Q; and a control circuit CONT controlling electric current flowing through the inductor by ON/OFF controlling the switching element Q;

In some embodiments, a control circuit includes: a zero current detecting circuit that detects zero current of the electric current flowing through the inductor L and turns ON the switching element Q; an ON width generating circuit that compares a comparison reference voltage generated based on an output voltage Vo obtained at the output capacitor C2 with a ramp voltage vramp generated upon turning ON of the switching element Q to determine an ON width Ton of the switching element Q, and turns OFF the switching element Q; an OFF width detecting circuit that detects an OFF width Toff of the switching element Q based on an output of the ON width generating circuit and an output of the zero current detecting circuit and holds the OFF width Toff until the next operating cycle; and an ON width adjusting circuit that is included in the ON width generating circuit and adjusts the ON width Ton of the switching element Q in the next operating cycle according to the OFF width Toff detected by the OFF width detecting circuit.

In some embodiments, the comparison reference voltage is an error voltage of the output voltage Vo obtained at the output capacitor C2 with respect to a target output voltage; and the ON width generating circuit preferably determines the ON width Ton of the switching element Q by the period until the ramp voltage vramp exceeds the comparison reference voltage.

In some embodiments, the OFF width detecting circuit is reset on turning OFF of the switching element Q and then detects a charged voltage voff that is charged on a capacitor by a constant current source during a period until turning ON of the switching element Q as a piece of information that indicates the OFF width Toff of the switching element Q, and holds the charged voltage voff throughout an ON period of the switching element.

In some embodiments, the ON width adjusting circuit adjusts a gradient of the ramp voltage vramp (a voltage rising rate) corresponding to the OFF width Toff detected by the OFF width detecting circuit.

Specifically, in some embodiments, the ON width adjusting circuit decreases a gradient of the ramp voltage vramp corresponding to the OFF width Toff detected by the OFF width detecting circuit to elongate the ON width Ton of the switching element Q when the OFF width Toff is shorter than a predetermined period of time.

In some embodiments, the OFF width Toff of the switching element Q is detected in the control circuit for ON/OFF controlling the switching element Q utilizing the output of the zero current detecting circuit included in the control circuit. The detected OFF width Toff is used to determine the ON width Ton of the switching element Q in the next operation cycle. Consequently, the phase information of the input voltage Vi is obtained without undesirable influence of a detection resistor and a noise different from the conventionally proposed technique, in which the phase information is obtained from the current detected using a detecting resistor. Accordingly, at the phase of low instantaneous value of the input voltage Vi, the ON width Ton of the switching element Q can be broadened surely with a high accuracy based on the OFF width Toff of the switching element Q determined corresponding to the input voltage Vi. Therefore, deterioration of power factor is effectively avoided at the phase of low instantaneous value of the input voltage Vi.

DETAILED DESCRIPTION

The following describes a switching power supply device according to some embodiments of the invention with reference to the accompanying drawings.

Figure 1:
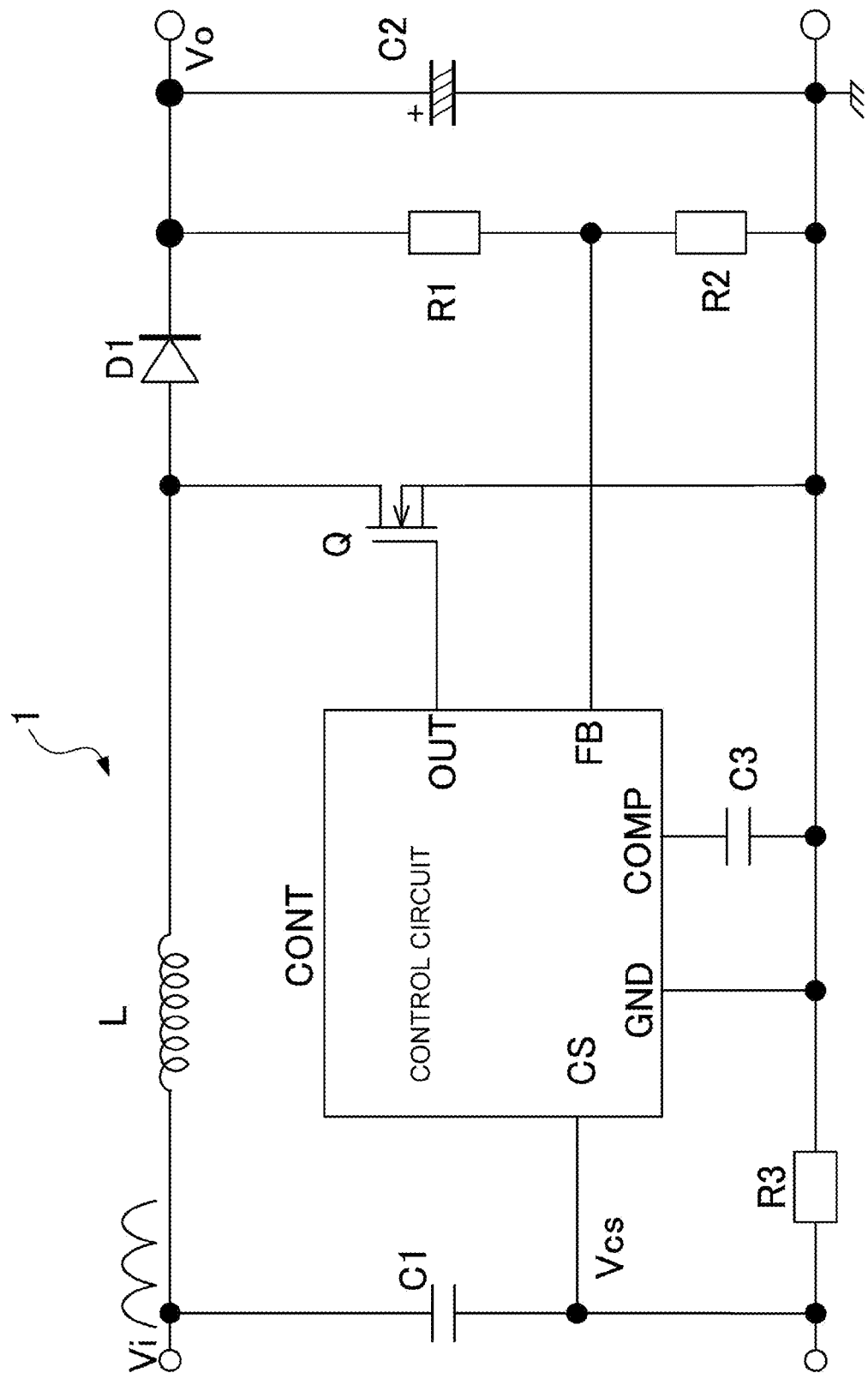
FIG. 1 shows a schematic construction of a switching power supply device according to an embodiment of the invention.
Figure 2:
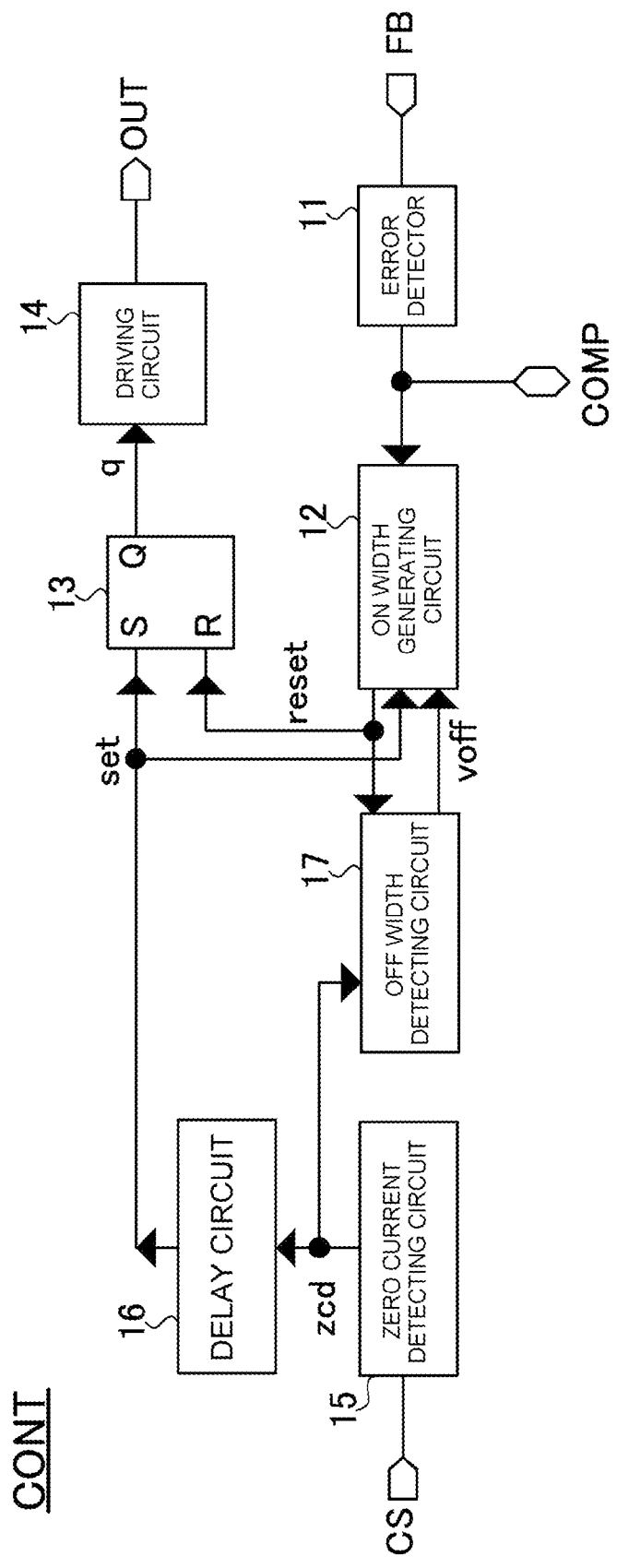
FIG. 2 shows a schematic construction of an essential part of the control circuit indicated in FIG. 1.
Figure 9:
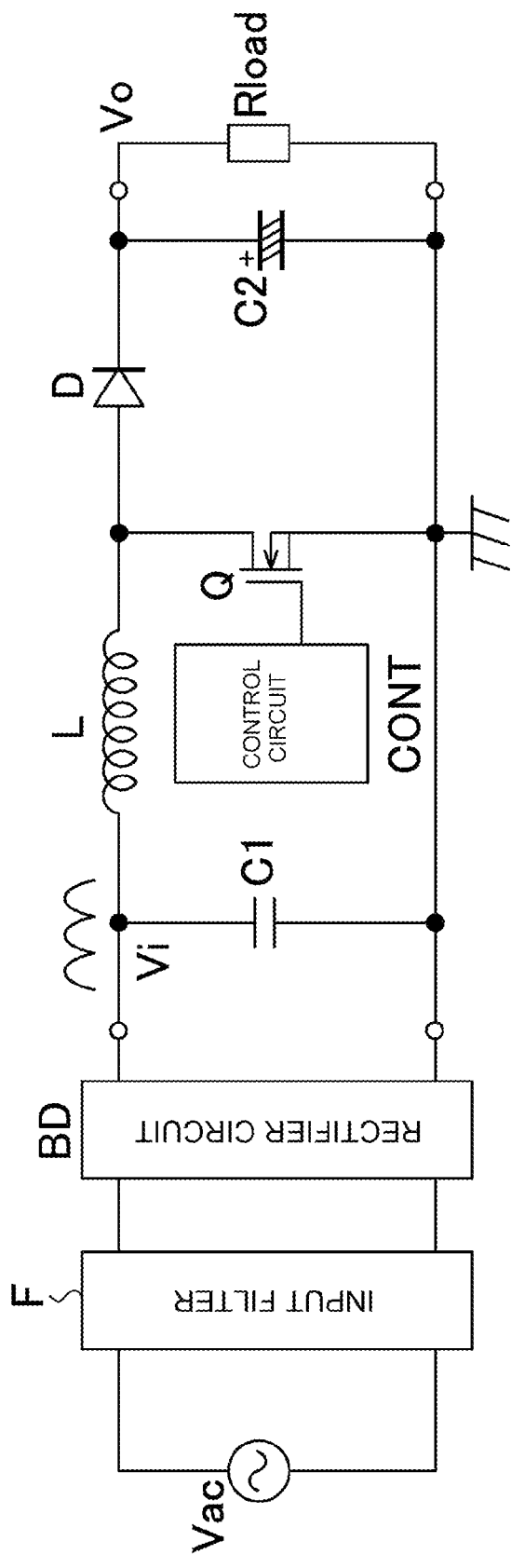
FIG. 9 shows a schematic construction of a switching power supply device, a power factor correction converter, of a boost chopper type.
Figure 10:
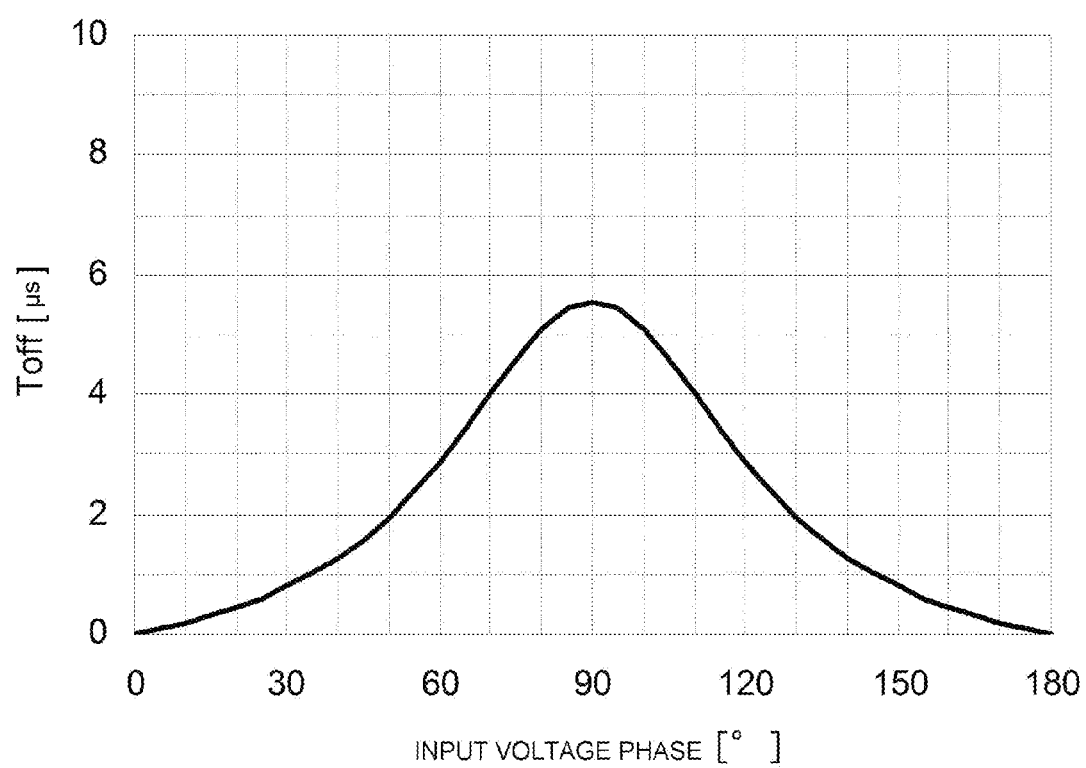
FIG. 10 shows a relationship between the phase of the input voltage Vi and the OFF width Toff.

FIG. 1 shows a schematic construction of a switching power supply device 1, a power factor correction converter, of a boost chopper type of the embodiment; and FIG. 2 shows a schematic construction of a control circuit CONT in the switching power supply device 1 shown in FIG. 1. In FIG. 1, the same parts as those in the switching power supply device of FIG. 9 are given the same symbols, but the input filter F and the rectifier circuit BD are omitted in FIG. 1.

The control circuit CONT is a power supply driving IC to drive directly a MOS-FET used for the switching element Q. The control circuit CONT is provided, in particular, with a terminal CS for current detection and a voltage feedback input terminal FB for output voltage detection as well as an output terminal OUT for controlling the gate voltage of the MOS-FET. In addition, the control circuit CONT has a terminal COMP for error detection and compensation, a ground terminal GND for defining an operation base voltage, and power supply input terminal VCC (not shown in the figure).

This embodiment has series-connected resistors R1 and R2 that are connected in parallel with the output capacitor C2. The output voltage Vo obtained across the output capacitor C2 is detected and divided with the resistors R1 and R2 and delivered to the voltage feedback input terminal FB. A resistor R3 for current detection is inserted in the current path including the inductor L, specifically in the negative side of the power supply line. The voltage across the resistor R3 is given to the terminal CS for current detection corresponding to the inductor current through the inductor L. A capacitor C3 for output compensation of an error detector (described later) is connected between the terminal COMP for error detection and compensation and the negative side of the power supply line.

In the description of this embodiment, zero current detection is conducted from the voltage generated across the resistor R3 by the current flowing in the inductor L, which is a negative current detection mode. Zero current detection can also be carried out by providing the inductor L with an auxiliary winding (not shown in the figure) and giving the voltage developed across the auxiliary winding corresponding to the inductor current to the current detection terminal CS, which is an auxiliary winding detection mode.

The control circuit CONT as shown in FIG. 2 has an error detector 11 that determines a difference between a voltage, which is a resistor-divided voltage of the output voltage Vo, proportional to the output voltage Vo given to the voltage feedback input terminal FB and a reference voltage corresponding to a predetermined target output voltage. The reference voltage set in the error detector 11 is a voltage obtained by dividing the target output voltage to be obtained by the switching power supply device 1 with the same dividing ratio as the one with the resistors R1 and R2. Thus, the error determined by the error detector 11 corresponds to the difference between the output voltage Vo and the target output voltage. The compensation capacitor C3 performs phase compensation of the output characteristic of the error detector 11 and eliminates a ripple component appearing at the voltage feedback input terminal FB at a doubled frequency of the input power supply frequency.

The ON width generating circuit 12 basically generates a signal for defining the ON width Ton of the driving signal for turning ON the switching element Q, a MOS-FET, according to the error of the output voltage Vo from the target output voltage, the error being determined in the error detector 11. This ON width generating circuit 12 turns OFF the switching element Q by resetting a flip-flop (FF) 13 with the output signal for determining the ON width Ton generated as described above. The flip-flop 13 delivers an output signal q at a high level (H-level) by setting and delivers an output signal q at a low level (L-level) by resetting. The driving circuit 14, receiving the output q from the flip-flop 13, ON/OFF drives the switching element Q.

The zero current detecting circuit 15 compares the voltage corresponding to the inductor current given to the current detecting terminal CS with a preset reference voltage and detects the timing of zero return of the inductor current, and delivers a zero current detection signal zcd. The flip-flop 13 is basically set upon receiving the zero current detection signal zcd and the driving circuit 14 turns ON the switching element Q upon receiving the output q from the slip-flop 13. In other words, the zero current detecting circuit 15 turns the switching element Q ON by setting the flip-flop 13 with the zero current detecting signal zcd.

In further detail, the zero current detecting signal zcd is delivered to the set terminal of the flip-flop 13 through the delay circuit 16 after a predetermined delay time. The delay time Tzcd set in the delay circuit 16 is an adjusting time for turning ON the switching element Q at the timing of the lowest voltage (a valley of voltage) applied to the switching element Q after return of the inductor current to zero.

At the turning OFF time of the switching element Q, the switching element Q is subjected to a high voltage from the inductor L. The inductor current, after decreasing to return to zero, swings into the negative current region by resonant oscillation caused by the inductance of the inductor L and a parasitic capacitance component of the current path including the inductor L. Accompanying this current oscillation, the voltage that the switching element Q undergoes also oscillates. At the moment the inductor current changes from negative to positive, the voltage the switching element undergoes becomes the lowest (a voltage valley).

The delay circuit 16 delays the zero current detection signal zcd so that the switching element Q turns ON at the moment it undergoes the minimum voltage after the zero current detection. The delay time Tzcd in the delay circuit 16 is set corresponding to the circuit parameters of the switching power supply device 1. Owing to the delay of the zero current detection signal zcd in the delay circuit 16, the switching loss at the turn ON time of the switching element Q is limited to the smallest and the surge current that develops at the turn ON time of the switching element Q is also suppressed to the minimum.

In addition to these basic functional circuits, the control circuit CONT further comprises an OFF width detecting circuit 17. The OFF width detecting circuit 17 detects the OFF width Toff to indicate an OFF period of the switching element Q according to an output signal 'reset' generated in the ON width generating circuit 12 to determine the ON width Ton and also according to the zero current detection signal zcd detected by the zero current detection circuit 15. The OFF width detecting circuit 17 gives the detected voltage signal voff indicating the OFF width Toff to the ON width generating circuit 12 and adjust the ON width Ton that is to be generated in the ON width generating circuit 12.

Figure 3:
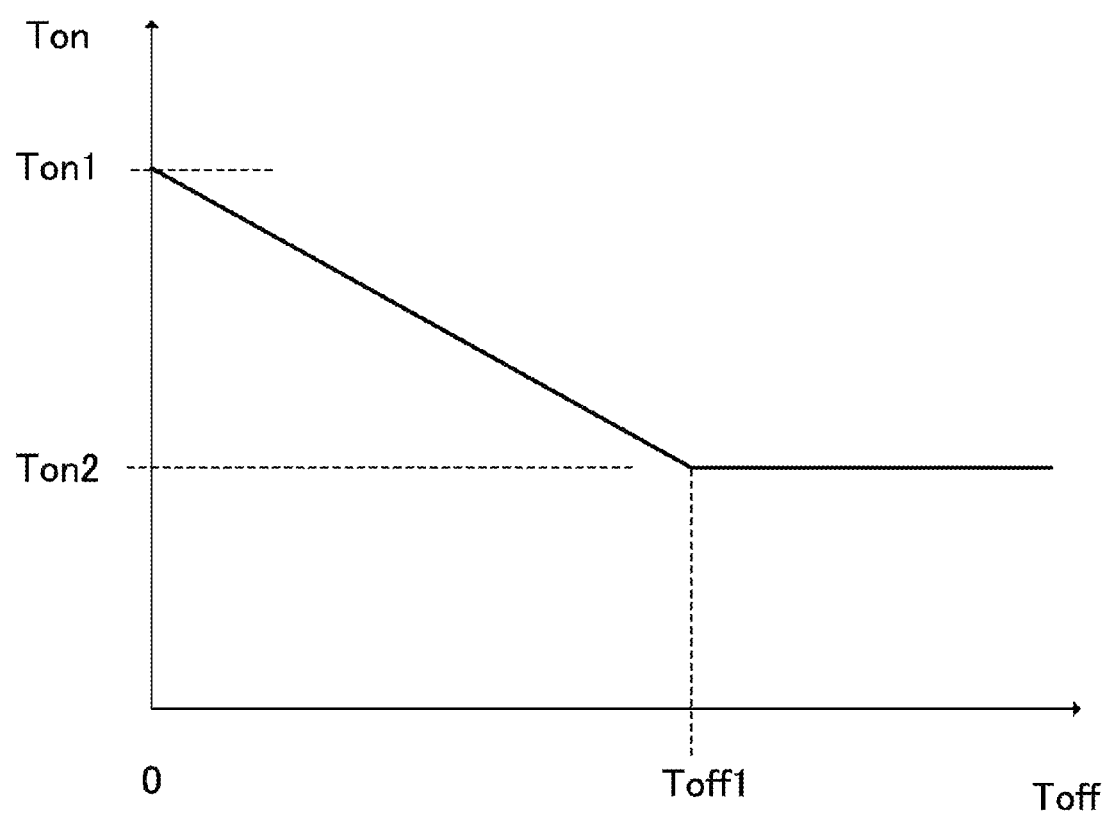
FIG. 3 shows relationship between an OFF width Toff and an ON width Ton to illustrate a function of an ON width adjusting circuit.

The ON width generating circuit 12 includes an ON width adjusting circuit for adjusting the ON width Ton according to the voltage signal voff that indicates the OFF width Toff. The ON width adjusting circuit adjusts or set at a longer value the ON width Ton of the switching element Q corresponding to the detected OFF width Toff when the OFF width Toff of the switching element Q becomes shorter than a predetermined OFF width Toff1, as shown by the conceptual chart in FIG. 3, caused by decrease in the instantaneous value of the input voltage Vi on the inductor L in a low voltage phase. The ON width adjusting circuit is described later as well as a specific construction of the ON width generating circuit 12.

The ON width adjusting circuit adjusts the ON width Ton of the switching element Q and in particular, elongates the ON width Ton at a phase of low instantaneous values of the input voltage Vi so as to maintain sufficient current supplied to the inductor L. Thus, a dead angle, a reactive voltage phase, is reduced and a low power factor of the switching power supply device 1 is avoided. In other words, power factor correction is achieved at low voltage phases of the input voltage Vi.

Figure 4:
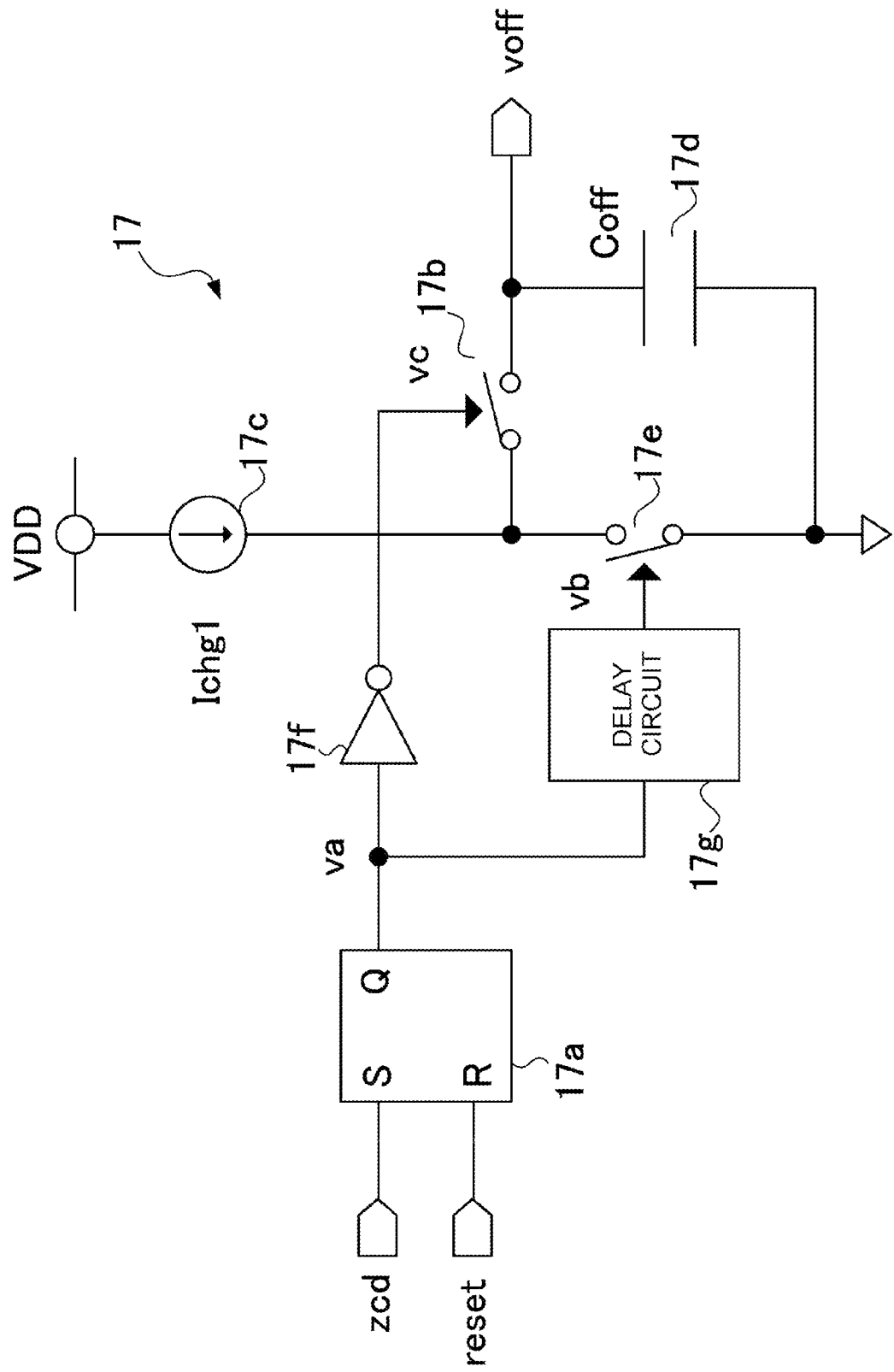
FIG. 4 shows an example of construction of an OFF width detecting circuit.

The following describes about the OFF width detecting circuit 17 more specifically. As shown in an example of construction of FIG. 4, the OFF width detecting circuit 17 comprises a flip-flop 17a that is set by the zero current detection signal zcd and reset by the output signal 'reset' from the ON width generating circuit 12. The OFF width detecting circuit 17 also comprises a capacitor 17d (Coff) that is connected, through a first switch 17b, to a constant current source 17c (Ichg1) for charging the capacitor 17d and generates a voltage signal voff indicating the OFF width Toff. The OFF width detecting circuit 17 further comprises a second switch 17e that controls the charging of the capacitor 17d by the constant current source 17c and holds the voltage signal voff charged on the capacitor 17d until the next operation cycle and then reset.

The first and second switches 17b and 17e are ON/OFF controlled by the output va of the flip-flop 17a. The first switch 17b is ON/OFF controlled by the signal vc that is the output va of the flip-flop 17a inverted by the inverter 17f. The second switch 17e is ON/OFF controlled by the signal vb that is the output va of the flip-flop 17a delayed by the delay circuit 17g.

The delay circuit 17g generates the signal vb for ON/OFF controlling the second switch 17e. The signal vb rises up at the leading edge of the output va of the flip-flop 17a and the trailing edge of the signal vb is delayed from that of the output va by a certain period of time. The delay time in generating the signal vb corresponds to the delay time for the zero current detection signal zcd by the delay circuit 16.

Figure 5:
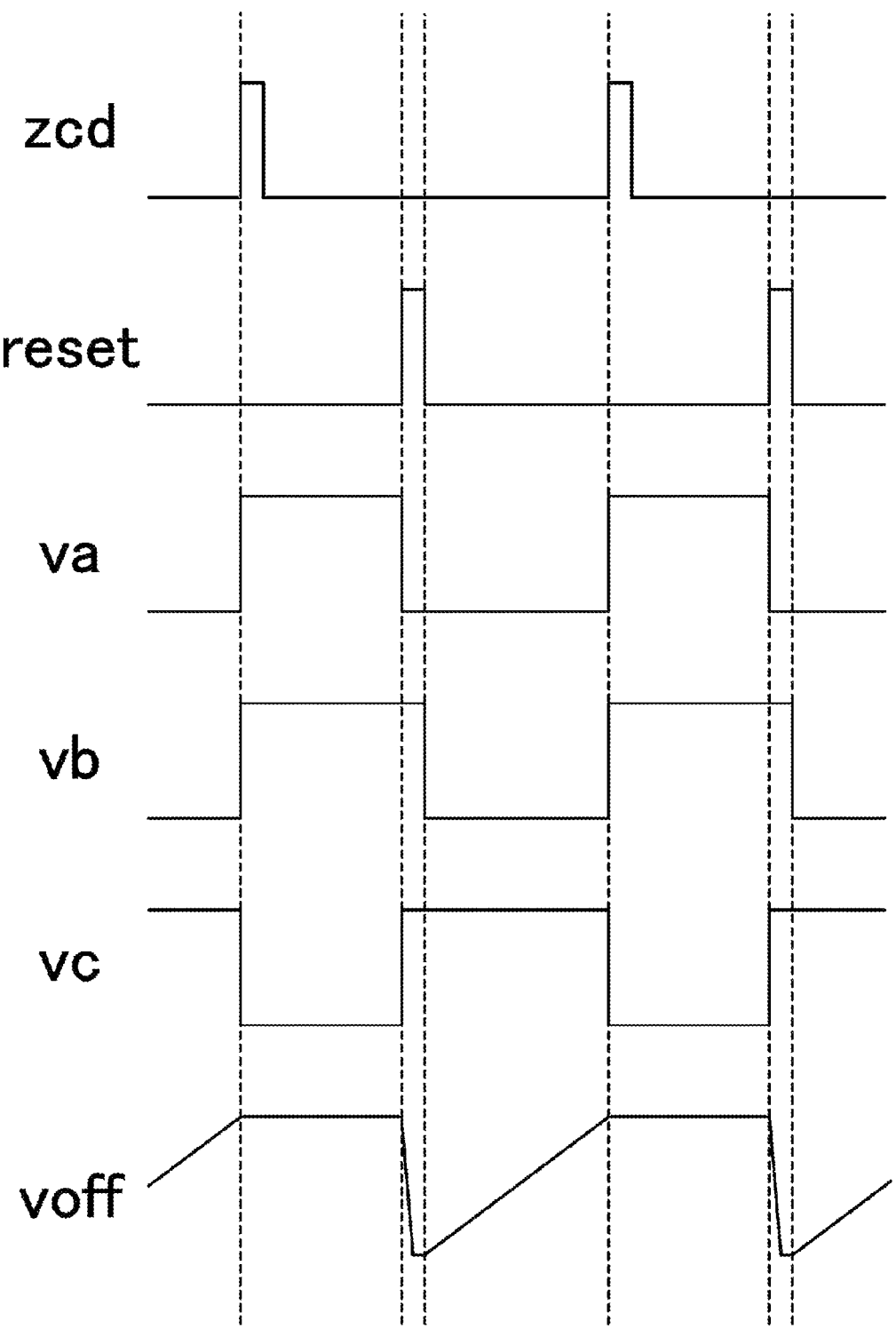
FIG. 5 is a timing chart showing the operation of the OFF width detecting circuit shown in FIG. 4.

The OFF width detecting circuit 17 having the construction described above operates as shown by the timing chart of FIG. 5. Since the flip-flop 17a is set by the zero current detection signal zcd and reset by the output signal of the ON width generating circuit 12, the output va of the flip-flop 17a is a signal with a pulse width corresponding to the ON width Ton of the switching element Q. The second switch 17e is ON/OFF controlled by the signal vb that is delayed from the output va of the flip-flop 17a; and the first switch 17b is ON/OFF controlled by the signal vc that is the inverted signal of the output va and corresponds to the OFF period of the switching element Q. Since the first switch 17b is held in the OFF state in the ON period of the switching element Q, the voltage voff charged on the capacitor 17d is maintained over the ON period of the switching element Q.

After that, when the flip-flop 17a is reset accompanying the turning OFF of the switching element Q by the output signal of the ON width generating circuit 12, temporary overlap occurs, as shown in FIG. 5, between the ON state (conducting state) of the first switch 17b brought about by the signal vc and the ON state (conducting state) of the second switch 17e brought about by the signal vb. As a result, the voltage voff charged on the capacitor 17d is discharged immediately through the first and second switches 17b and 17e.

After the discharge of the capacitor 17d, the second switch 17e turns OFF caused by disappear of the signal vb, and the first switch 17b becomes ON again until the switching element Q turns OFF. Consequently, the capacitor 17d is charged by the constant current source 17c (Ichg1) throughout the OFF period of the switching element Q. As a result, the capacitor 17d is charged to the voltage voff corresponding to the OFF width Toff of the switching element Q. After that, when the first switch 17b turns OFF accompanying turning ON of the switching element Q, the voltage voff charged on the capacitor 17d is again maintained throughout the ON period of the switching element Q.

Figure 6:
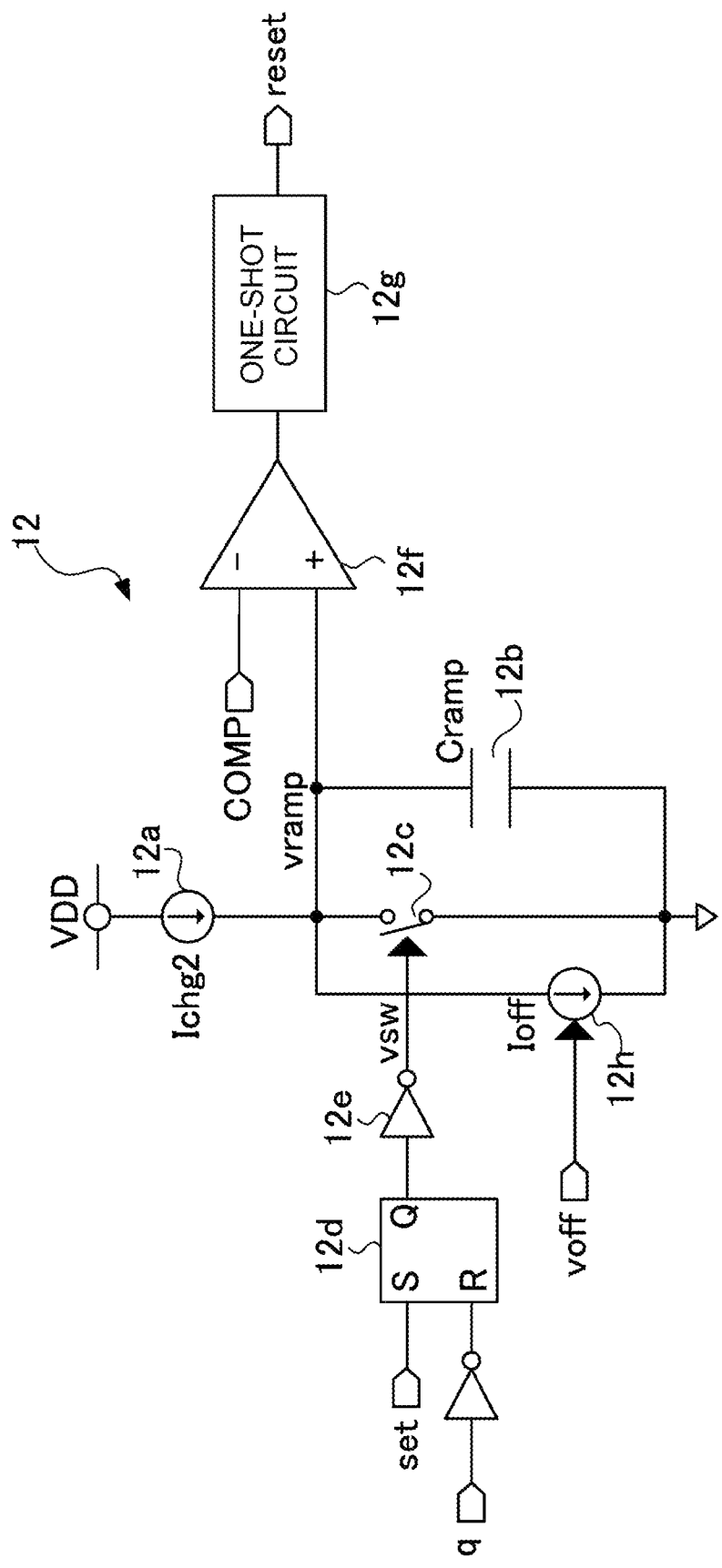
FIG. 6 shows an example of construction of an ON width generating circuit that includes the ON width adjusting circuit.

The ON width generating circuit 12 is constructed as shown in FIG. 6, for example. The ON width generating circuit 12 comprises a capacitor 12b (Cramp) that is basically charged by a constant current source 12a (Ichg2) and generates ramp voltage vramp. The capacitor 12b is discharged to hold it in a zero reset state when a switch 12c connected in parallel with the capacitor 12b is ON, and the capacitor 12b is charged by the constant current source 12a (Ichg2) only when the switch 12c is OFF.

The switch 12c is ON/OFF controlled receiving a signal vsw that is obtained by inverting the output signal of a flip-flop 12d through an inverter 12e, the flip-flop 12d being set receiving the output of the delay circuit 16. Consequently, the capacitor 12b starts to be charged, as shown in the operational timing chart of FIG. 7, when the switch 12c turns OFF or at the moment the switching element Q turns ON. The ramp voltage vramp charged on the capacitor 12b is given to a comparator 12f and compared with the voltage error COMP detected by the error detector 11.

Figure 7:
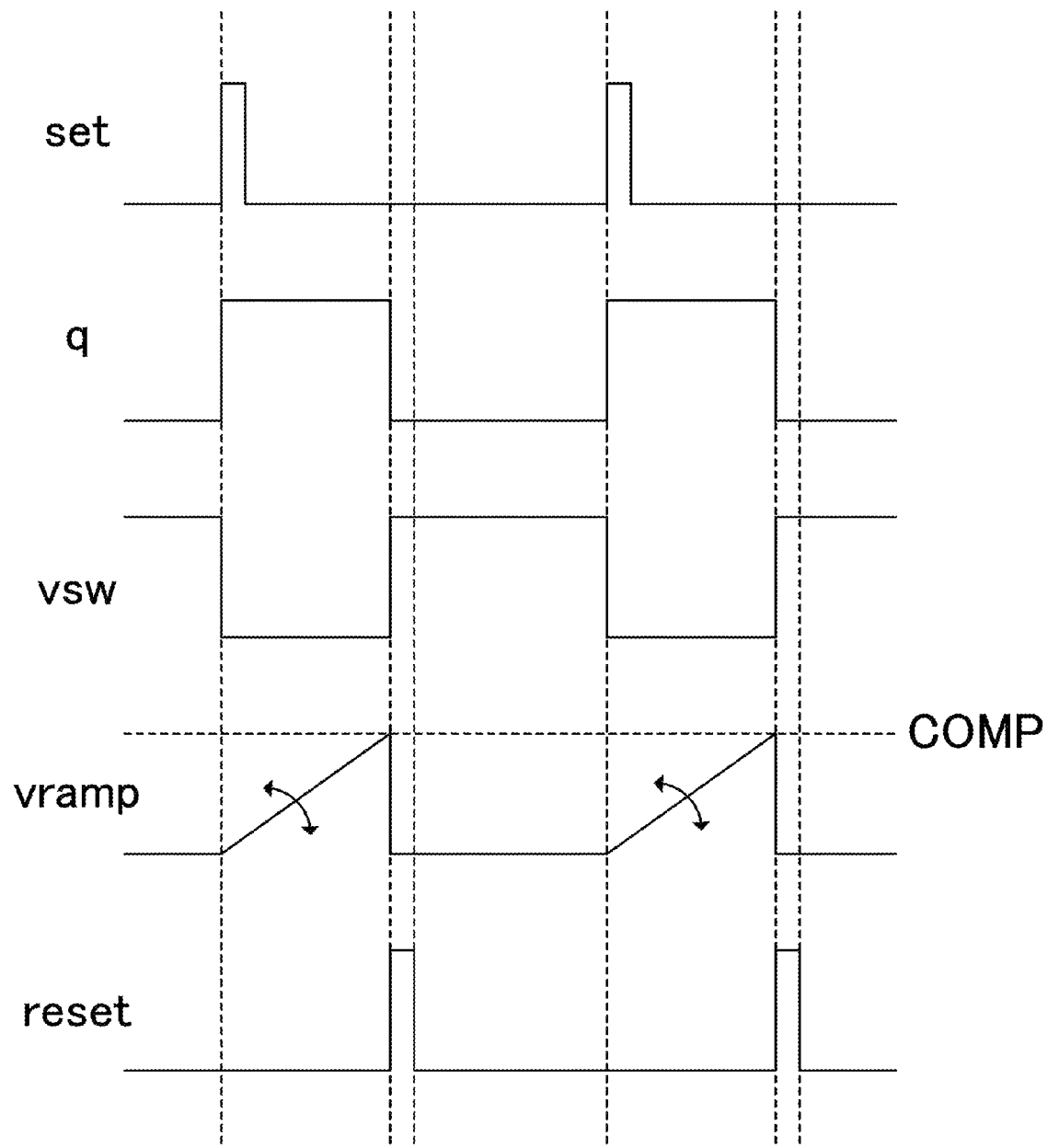
FIG. 7 is a timing chart showing the operation of the ON width generating circuit that includes the ON width adjusting circuit shown in FIG. 6.

The comparator 12f inverts the output thereof to excite a one-shot circuit 12g when the ramp voltage vramp reaches the voltage error COMP, and generates a signal 'reset' to determine the ON width Ton of the switching element Q as shown in FIG. 7. The comparator 12f detects a period to determine the ON width Ton of the switching element Q by sensing the time at which the ramp voltage vramp generated by charging the capacitor 12b reaches the voltage error COMP. The signal 'reset' to turn OFF the switching element Q is generated by the one-shot circuit 12g that is excited by the comparator 12f.

In addition to the circuit components for performing these basic functions, the ON width generating circuit 12 comprises an ON width adjusting circuit for adjusting the ON width Ton of the switching element Q according to the voltage voff that is detected in the OFF width detecting circuit 17 and corresponds to the OFF width Toff of the switching element Q. The ON width adjusting circuit is composed of a variable current source 12h (Ioff) that is connected in parallel to the capacitor 12b for generating the ramp voltage vramp and reduces the current from the constant current source 12a.

Figure 8:
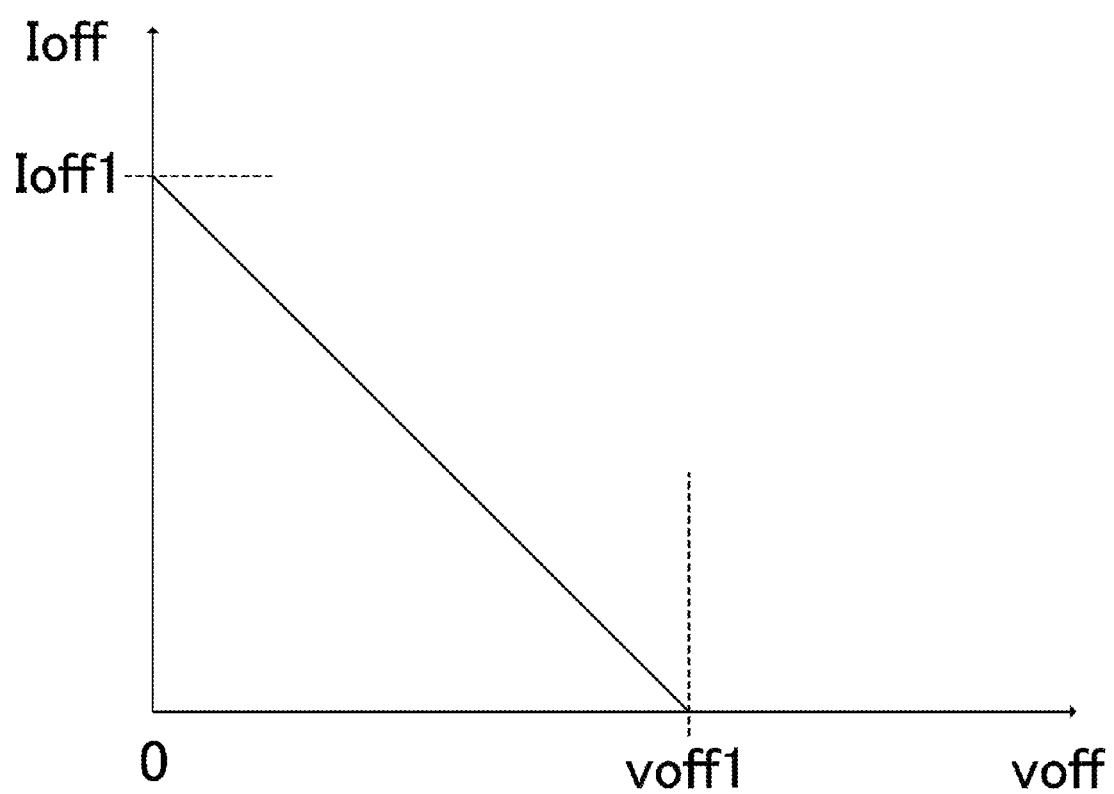
FIG. 8 shows a relationship between the output current Ioff of a variable current source composing the ON width adjusting circuit and a voltage voff indicating the OFF width Toff.

The variable current source 12h has a current output characteristic as shown in FIG. 8 that the output current Ioff from the variable current source 12h increases with decrease of the voltage voff when the voltage voff is lower than a predetermined voltage voff1. Since the output current Ichg2 from the constant current source 12a is reduced by the output current Ioff from the variable current source 12h, the charging speed of the capacitor 12b slows down to decrease the gradient of the ramp voltage vramp (voltage rising rate). As a result, it takes longer time for the ramp voltage vramp to reach the voltage error COMP, which delays the moment to determine the ON width Ton of the switching element Q. In other words, when the voltage voff corresponding to the OFF width Toff of the switching element Q is low, the ON width Ton is adjusted broader.

As describe above, the control circuit CONT comprises the OFF width detecting circuit 17 and the ON width adjusting circuit, which is the variable current source 12h included in the ON width generating circuit 12. When the input voltage Vi given to the inductor L is at a low voltage phase (or when the instantaneous value of the input voltage Vi is low), the control circuit CONT having this construction adjusts the ON width Ton of the switching element Q broader corresponding to the OFF width Toff of the switching element Q at one cycle before. Therefore, a sufficient amount of current is ensured in the inductor L even in a low voltage phase of the input voltage Vi and deterioration of power factor is effectively avoided.

Different from the devices disclosed in Patent Documents 1 and 2, in which the phase information about the input voltage Vi is obtained from the current value detected by a detecting resistor, the phase information about the input voltage Vi is obtained using the output from the zero current detecting circuit 15 included in the control circuit CONT as the OFF width Toff of the switching element Q. Thus, the phase information about the input voltage Vi is detected with high accuracy. The accurate phase information about the input voltage Vi is obtained without being affected by the noises superimposed on the power supply line.

In particular, the OFF width detecting circuit 17 detects the OFF width Toff of the switching element Q, and the OFF width Toff is used by the ON width adjusting circuit, which is the variable current source 12h included in the ON width generating circuit 12, to adjust the ON width Ton of the switching element Q at the next operation cycle. Therefore, the switching loss at a low voltage phase of the input voltage Vi is readily and effectively suppressed. In other words, the phase information of the input voltage Vi is detected with high accuracy to determine or adjust the ON width Ton of the switching element Q. Therefore, the switching power supply device of the invention operates stably and with high accuracy.

Embodiments of the invention are not limited to the above-described features. In the OFF width detecting circuit 17, for example, the OFF width Toff of the switching element Q can be detected using the output of the delay circuit 16 in place of using the output signal zcd of the zero current detecting circuit 15. In this case, which utilizes the turn ON timing of the switching element Q, accuracy in detecting the OFF width Toff may be a little worse taking the switching characteristic of the switching element Q into consideration.

In the embodiment described above, zero current detection is carried out using the resistor R3 inserted in the power supply line. However, embodiments of the invention can be applied to a switching power supply device that detects the zero current of the inductor current by means of an auxiliary winding detection method as described previously. Moreover, it should be noted that embodiments of the invention can be carried out with various modifications within the scope and spirit of the invention.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2012-113871, filed on May 17, 2012. The disclosure of the priority application, in its entirety, including the drawings, claims, and the specification thereof, is incorporated herein by reference.

What is claimed is:

1. A switching power supply device that has:
   an inductor connected to a rectifier circuit for rectifying AC power,
   a switching element forming a current path from the rectifier circuit through the inductor in an ON state of the switching element;
   a diode forming a current path from the inductor to an output capacitor in an OFF state of the switching element; and
   a control circuit controlling electric current flowing through the inductor by ON/OFF controlling the switching element;
   the control circuit comprising:
   a zero current detecting circuit that detects zero current of the electric current flowing through the inductor and turns ON the switching element;
   an ON width generating circuit that compares a comparison reference voltage generated based on an output voltage obtained at the output capacitor with a ramp voltage generated upon turning ON of the switching element to determine an ON width of the switching element, and turns OFF the switching element;
   an OFF width detecting circuit that detects an OFF width of the switching element based on an output of the ON width generating circuit and an output of the zero current detecting circuit and holds the OFF width until a next operating cycle; and
   an ON width adjusting circuit that is included in the ON width generating circuit and adjusts the ON width of the switching element in a next operating cycle according to the OFF width detected by the OFF width detecting circuit.

2. The switching power supply device according to claim 1, wherein the comparison reference voltage is an error voltage of the output voltage obtained at the output capacitor with respect to a target output voltage and the ON width generating circuit determines the ON width of the switching element by the period until the ramp voltage exceeds the comparison reference voltage.

3. The switching power supply device according to claim 1, wherein the OFF width detecting circuit is reset on turning OFF of the switching element, detects a charged voltage that is charged on a capacitor by a constant current source during a period until turning ON of the switching element as the OFF width of the switching element, and holds the charged voltage throughout an ON period of the switching element.

4. The switching power supply device according to claim 1, wherein the ON width adjusting circuit adjusts a gradient of the ramp voltage corresponding to the OFF width detected by the OFF width detecting circuit.

5. The switching power supply device according to claim 3, wherein the ON width adjusting circuit decreases a gradient of the ramp voltage corresponding to the OFF width detected by the OFF width detecting circuit to elongate the ON width of the switching element when the OFF width is shorter than a predetermined period of time.

* * * * *

UNITED STATES PATENT AND TRADEMARK OFFICE
CERTIFICATE OF CORRECTION

| | | |
|---|---|---|
| PATENT NO. | : 9,143,035 B2 | Page 1 of 1 |
| APPLICATION NO. | : 13/860980 | |
| DATED | : September 22, 2015 | |
| INVENTOR(S) | : Jian Chen | |

It is certified that error appears in the above-identified patent and that said Letters Patent is hereby corrected as shown below:

Title Page

In item (73) ASSIGNEE: the Assignee is incorrect and should appear as follows:

--FUJI ELECTRIC CO., LTD. (JP)--.

In item (56) References Cited, under FOREIGN PATENT DOCUMENTS:
--JP 2008-136307 * 6/2008-- should be listed.

Signed and Sealed this
Twenty-ninth Day of March, 2016

Michelle K. Lee
*Director of the United States Patent and Trademark Office*